(12) United States Patent
Lee et al.

(10) Patent No.: US 12,471,884 B2
(45) Date of Patent: Nov. 18, 2025

(54) BLADDER MONITORING DEVICE AND METHOD USING ULTRASONIC SENSOR

(71) Applicants: DAEGU GYEONGBUK INSTITUTE OF SCIENCE AND TECHNOLOGY, Daegu (KR); RESEARCH COOPERATION FOUNDATION OF YEUNGNAM UNIVERSITY, Gyeongsan-si (KR)

(72) Inventors: Sungwon Lee, Dangjin-si (KR); Younghwii Ko, Daegu (KR); Yeonghun Yun, Incheon (KR)

(73) Assignees: DAEGU GYEONGBUK INSTITUTE OF SCIENCE AND TECHNOLOGY, Daegu (KR); RESEARCH COOPERATION FOUNDATIONOF YEUNGNAMUNIVERSITY, Gyeongsan-si (KR)

( * ) Notice: Subject to any disclaimer, the term of this patent is extended or adjusted under 35 U.S.C. 154(b) by 486 days.

(21) Appl. No.: 17/603,079

(22) PCT Filed: Apr. 14, 2020

(86) PCT No.: PCT/KR2020/005002
§ 371 (c)(1),
(2) Date: Oct. 12, 2021

(87) PCT Pub. No.: WO2020/235810
PCT Pub. Date: Nov. 26, 2020

(65) Prior Publication Data
US 2022/0183660 A1 Jun. 16, 2022

(30) Foreign Application Priority Data
May 21, 2019 (KR) .......................... 10-2019-0059309

(51) Int. Cl.
*A61B 8/00* (2006.01)
*A61B 8/08* (2006.01)

(52) U.S. Cl.
CPC .............. *A61B 8/48* (2013.01); *A61B 8/0833* (2013.01); *A61B 8/5207* (2013.01)

(58) Field of Classification Search
None
See application file for complete search history.

(56) References Cited

U.S. PATENT DOCUMENTS

| 5,964,710 A | 10/1999 | Ganguly et al. |
| 6,565,512 B1 | 5/2003 | Ganguly et al. |

(Continued)

FOREIGN PATENT DOCUMENTS

| CN | 1314794 | 9/2001 |
| JP | 4677615 | 4/2011 |

(Continued)

OTHER PUBLICATIONS

EPO, Extended European search report of Application No. 20809992.9, dated May 23, 2023.

*Primary Examiner* — Shahdeep Mohammed
*Assistant Examiner* — Farouk A Bruce
(74) *Attorney, Agent, or Firm* — LEX IP MEISTER, PLLC

(57) ABSTRACT

Provided is a bladder monitoring apparatus including: an ultrasonic sensor module including an ultrasonic sensor configured to transmit an ultrasonic wave toward a front wall of a bladder and receive the reflected ultrasonic wave; a control module configured to measure a passage time interval, calculate distance information, and calculate a volume of the bladder from the distance information and (Continued)

configuration information; and an output module configured to output the bladder volume calculated by the control module.

7 Claims, 6 Drawing Sheets

(56) References Cited

U.S. PATENT DOCUMENTS

| | | | | |
|---|---|---|---|---|
| 2007/0123778 A1* | 5/2007 | Kantorovich | ........... | G01S 15/88 |
| | | | | 600/437 |
| 2011/0137172 A1* | 6/2011 | Kim | ........................ | A61B 8/483 |
| | | | | 600/449 |
| 2013/0023786 A1* | 1/2013 | Mani | ........................ | A61F 13/42 |
| | | | | 600/561 |
| 2016/0058422 A1* | 3/2016 | Lee | ........................ | A61B 8/4472 |
| | | | | 600/443 |
| 2018/0228462 A1 | 8/2018 | Maghsoudnia et al. | | |

FOREIGN PATENT DOCUMENTS

| | | |
|---|---|---|
| JP | 2011183142 | 9/2011 |
| JP | 6453459 | 1/2019 |
| KR | 10-1999-0024145 | 3/1999 |
| KR | 10-2007-0105097 | 10/2007 |
| KR | 10-1071994 | 10/2011 |
| KR | 10-1930883 | 12/2018 |
| WO | 2016199182 | 12/2016 |

\* cited by examiner

BLADDER MONITORING DEVICE AND METHOD USING ULTRASONIC SENSOR

TECHNICAL FIELD

The present disclosure relates to a bladder monitoring apparatus and method using an ultrasonic sensor and, more specifically, to a bladder monitoring apparatus and method for calculating the volume of a bladder by using an ultrasonic sensor.

BACKGROUND ART

Patients who suffer from neurogenic bladder diseases may have difficulty in urinating. Therefore, a method which enables a patient having a neurogenic bladder to recognize the time to discharge urine accumulated in a bladder has been required. Moreover, in a case of a patient whose urinating is managed by another person due to a reason such as dementia of the patient also, the manager should be capable of recognizing the time to discharge urine accumulated in the patient's bladder. However, measuring a bladder volume requires many devices and much costs. For this reason, it has been difficult by the prior art for patients to identify the state of his/her bladder in daily life.

DISCLOSURE OF INVENTION

Technical Problem

The technical task to be solved by the present disclosure is to provide an apparatus and a method by which the volume of the bladder can be monitored by measuring only a front wall of a bladder by using an ultrasonic sensor.

Solution to Problem

An apparatus according to an aspect of the present disclosure includes: an ultrasonic sensor module including an ultrasonic sensor configured to transmit an ultrasonic wave toward a front wall of a bladder and receive the ultrasonic wave returning after being reflected by the front wall of the bladder; a control module configured to measure a passage time interval from a time point at which the ultrasonic sensor transmits the ultrasonic wave to a time point at which the ultrasonic sensor receives the ultrasonic wave returning after being reflected by the front wall of the bladder, calculate distance information from the passage time interval and a speed of the ultrasonic wave, and calculate a volume of the bladder from the distance information and configuration information input from the outside; and an output module configured to output the bladder volume calculated by the control module.

In addition, the ultrasonic sensor module may include multiple ultrasonic sensors, and the multiple ultrasonic sensors may be arranged according to a two-dimensional arrangement and configured to transmit ultrasonic waves according to a pre-configured time period.

In addition, the control module may include: an input unit configured to receive configuration information relating to the bladder volume from the outside; a calculation unit configured to calculate the bladder volume from the configuration information and the passage time interval; and a storage unit configured to store information generated from the input unit or the calculation unit.

In addition, the configuration information may include: a bladder volume limit indicating the bladder volume of a time point at which the bladder is filled with a designated volume of urine; a front wall distance limit indicating a distance from the ultrasonic sensor to the front wall of the bladder in a state of the bladder volume limit; and a front wall to rear wall distance limit indicating a distance from the front wall of the bladder to a rear wall of the bladder in a state of the bladder volume limit.

In addition, the distance information may include: a front wall distance which is a distance from the ultrasonic sensor to the front wall of the bladder; and a front wall to rear wall distance which is a distance from the front wall of the bladder to the rear wall of the bladder, and the calculation unit may be configured to: calculate distance ratio information from the front wall distance limit and the front wall to rear wall distance limit; calculate the front wall distance from the passage time interval and the speed of the ultrasonic wave; calculate the front wall to rear wall distance from the distance ratio information and the front wall distance; calculate the bladder volume from multiple front wall to rear wall distances calculated in a process of a bladder volume measurement which is started according to transmission of an ultrasonic wave by each of multiple ultrasonic sensors; and calculate a bladder volume ratio from the bladder volume limit and the bladder volume.

In addition, the storage unit may be configured to store at least one of the distance ratio information, the front wall distance, the front wall to rear wall distance, the bladder volume ratio, and the bladder volume which are calculated by the calculation unit, and may store the configuration information received by the input unit.

In addition, the output module may be configured to output at least one of the bladder volume or the bladder volume ratio which is stored in the storage unit, and output a notification when the bladder volume ratio is larger than a pre-configured notification output ratio.

In addition, the storage unit may be configured to, when the output module outputs at least one of the bladder volume or the bladder volume ratio, remove the front wall distance and the front wall to rear wall distance which are stored in the storage unit.

A method according to an aspect of the present disclosure includes: an ultrasonic wave transmission operation of transmitting, by an ultrasonic sensor, an ultrasonic wave toward a front wall of a bladder; an ultrasonic wave reception operation of receiving the ultrasonic wave returning after reflection, by the front wall of the bladder, of the ultrasonic wave transmitted toward the front wall of the bladder in the ultrasonic wave transmission operation, and generating a passage time interval relating to the ultrasonic wave; an apparatus control operation of calculating distance information from the passage time interval and a speed of the ultrasonic wave, and calculating a volume of the bladder from the distance information and configuration information input from the outside; and a volume output operation of outputting the bladder volume calculated in the apparatus control operation.

In addition, the apparatus control operation may include: a configuration input operation of receiving the configuration information from the outside; a reference calculation operation of calculating distance ratio information from the configuration information; a volume calculation operation of calculating the bladder volume from the distance information and the distance ratio information; an information storage operation of storing at least one of pieces of information which are generated in the configuration input operation, the reference calculation operation, and the volume calculation operation; and an information removal operation of removing the at least one piece of information stored in the information storage operation.

In addition, the configuration information may include: a bladder volume limit indicating the bladder volume of a time point at which the bladder is filled with a designated volume of urine; a front wall distance limit indicating a distance from the ultrasonic sensor to the front wall of the bladder in a state of the bladder volume limit; and a front wall to rear wall distance limit indicating a distance from the front wall of the bladder to a rear wall of the bladder in a state of the bladder volume limit.

In addition, the distance information may include: a front wall distance which is a distance from the ultrasonic sensor to the front wall of the bladder; and a front wall to rear wall distance which is a distance from the front wall of the bladder to the rear wall of the bladder, and the volume calculation operation may include: calculating the front wall distance from the passage time interval and the speed of the ultrasonic wave; calculating the front wall to rear wall distance from the distance ratio information and the front wall distance; calculating the bladder volume from multiple front wall to rear wall distances calculated in a process of a bladder volume measurement which is started according to transmission of an ultrasonic wave by each of multiple ultrasonic sensors; and calculating a bladder volume ratio from the bladder volume limit and the bladder volume.

In addition, the information storage operation may include storing at least one of the configuration information, the distance ratio information, the front wall distance, the front wall to rear wall distance, the bladder volume ratio, and the bladder volume.

In addition, the volume output operation may include outputting at least one of the bladder volume or the bladder volume ratio which is stored in the information storage operation, and outputting a notification when the bladder volume ratio is larger than a pre-configured notification output ratio.

In addition, the information removal operation may include, when at least one of the bladder volume or the bladder volume ratio is output in the volume output operation, removing the front wall distance and the front wall to rear wall distance which are stored in the information storage operation.

Advantageous Effects of Invention

An aspect of the present disclosure described above provides a bladder monitoring method and apparatus which is simple to use, so that a patient or a caregiver can easily identify the state of the patient's bladder, and thus each patient can urinate when it is required.

BEST MODE FOR CARRYING OUT THE INVENTION

Figure 1:
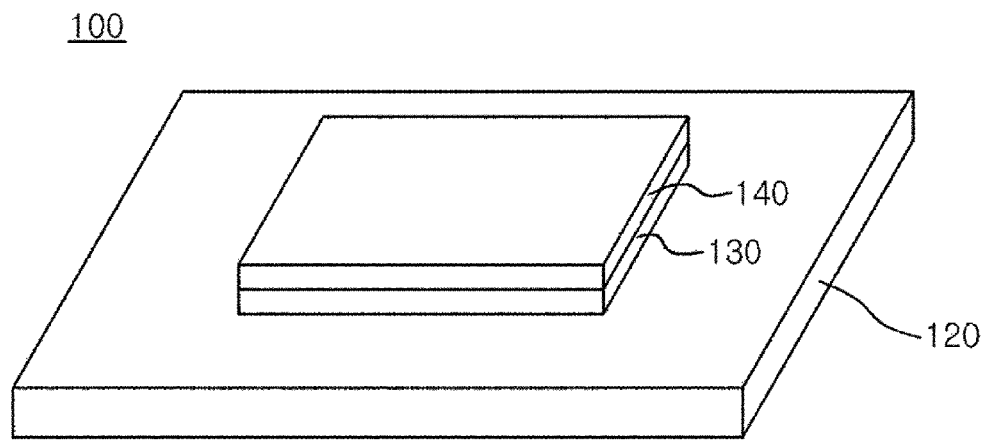
FIG. 1 is a perspective view of a bladder monitoring apparatus according to an embodiment of the present disclosure.

In the following detailed description of the present disclosure, reference is made to the accompanying drawings that show, by way of illustration, specific embodiments in which the present disclosure may be carried out. These embodiments are described in sufficient detail to enable those skilled in the art to carry out the present disclosure. It is to be understood that various embodiments of the present disclosure, although different, are not necessarily mutually exclusive. For example, a particular feature, structure, or characteristic described herein, in connection with one embodiment, may be implemented within other embodiments without departing from the spirit and scope of the present disclosure. In addition, it is to be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the appended claims are entitled. In the drawings, like numerals refer to the same or similar functionality throughout the several views.

Hereinafter, preferred embodiments of the present disclosure will be described in more detail with reference to the drawings.

FIG. 1 is a perspective view of a bladder monitoring apparatus according to an embodiment of the present disclosure.

A bladder monitoring apparatus 100 according to an embodiment of the present disclosure may include: an ultrasonic sensor module 120 including an ultrasonic sensor configured to transmit an ultrasonic wave 101 toward a front wall of a bladder and receive the ultrasonic wave 101 returning after being reflected by the front wall of the bladder; a control module 130 configured to measure a passage time interval from a time point at which the ultrasonic sensor transmits the ultrasonic wave 101 to a time point at which the ultrasonic sensor receives the reflected ultrasonic wave 101, calculate distance information from the passage time interval and a speed of the ultrasonic wave 101, and calculate a volume of the bladder from the distance information and configuration information input from the outside; and an output module 140 configured to display the bladder volume calculated by the control module 130.

The bladder monitoring apparatus 100 may be configured in various types by a person who implements the present disclosure such that the ultrasonic sensor module 120 is oriented toward a bladder, and may be mounted to a user. For example, the bladder monitoring apparatus 100 may be implemented to include an adhesive and is thus attachable to the skin, and the bladder monitoring apparatus 100 may be implemented in a type of belt to be fixed while surrounding a user's body. The present disclosure is not limited to such an embodiment, and may be variously carried out in the scope as set forth in the claims of the present disclosure.

The ultrasonic sensor module 120 may include an ultrasonic sensor configured to transmit the ultrasonic wave 101 and receive the ultrasonic wave 101 returning after being reflected by a front wall of a bladder.

The control module 130 may be configured to calculate a passage time interval indicating a passage time from a time point at which the ultrasonic sensor transmits the ultrasonic wave 101 to a time point at which the ultrasonic sensor receives the reflected ultrasonic wave 101.

The control module 130 may be configured to calculate distance information from the passage time interval and a speed of the ultrasonic wave 101, and receive configuration information from the outside. Accordingly, the control module 130 may calculate a volume of the bladder and a bladder volume ratio from the distance information and the configuration information. A detailed description thereof will be described with reference to FIG. 3.

The output module 140 may be configured to output the bladder volume and the bladder volume ratio. The bladder volume may be measured by the bladder monitoring apparatus 100, and the bladder volume ratio may indicate a ratio of the bladder volume to a bladder volume limit described below.

The output module 140 may be configured to output a notification when the bladder volume ratio is larger than a pre-configured notification output ratio. To this end, the control module 130 may be configured to receive an input of a notification output ratio. The notification such as a sound notification, a light notification, and a vibration notification may be output.

The output module 140 may be configured to output the bladder volume and the bladder volume ratio in a numerical type. The numerical type may express the bladder volume ratio as a percentage related to a bladder volume limit and may express a value of the bladder volume calculated from the bladder volume limit and the bladder volume ratio.

The output module 140 may be configured to output the bladder volume and the bladder volume ratio in a pictorial type. The pictorial type may indicate coloring a picture showing a shape of an empty bladder according to the bladder volume ratio. In addition, the pictorial type may show a bladder shape expanding according to the bladder volume ratio.

The output module 140 may be configured to output the bladder volume and the bladder volume ratio in a stepwise type. Stages may be configured according to a predetermined ratio interval in relation to a bladder volume limit, and the output module 140 may be configured to, when the bladder volume ratio is equal to or smaller than a minimum value of a particular stage, output the corresponding stage.

Figure 2:
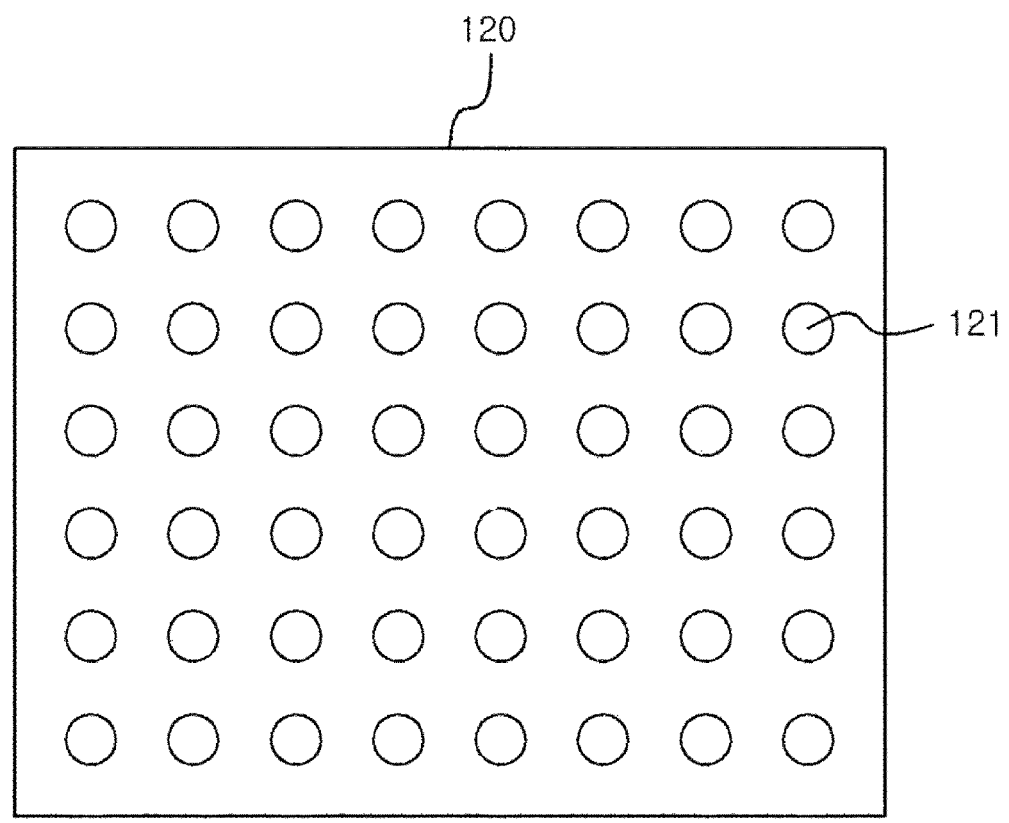
FIG. 2 is a bottom view of an ultrasonic sensor module according to an embodiment of the present disclosure.

FIG. 2 is a bottom view of an ultrasonic sensor module according to an embodiment of the present disclosure.

The ultrasonic sensor module 120 may include multiple ultrasonic sensors 121 arranged according to a two-dimensional arrangement.

The ultrasonic sensor module 120 may include different numbers of ultrasonic sensors 121 according to a size of a user's bladder. For example, the volume of the bladder of a small person can be measured with a smaller number of ultrasonic sensors 121 compared to that of a large person. Therefore, the ultrasonic sensor module 120 included in the bladder monitoring apparatus 100 for a small person may include a smaller number of ultrasonic sensors 121.

The ultrasonic sensor module 120 may cause the ultrasonic sensors 121 to transmit the ultrasonic waves 101 according to a pre-configured ultrasonic wave transmission period. To this end, the control module 130 may receive an input of the ultrasonic wave transmission period. Accordingly, the bladder monitoring apparatus 100 may output a bladder volume which is changed according to the ultrasonic wave transmission period.

Figure 3:
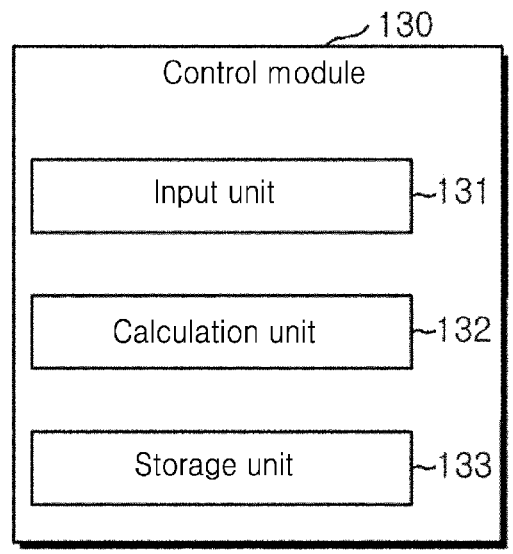
FIG. 3 is a control block diagram of a control module according to an embodiment of the present disclosure.

FIG. 3 is a control block diagram of a control module according to an embodiment of the present disclosure.

The control module 130 may include: an input unit 131 configured to receive configuration information relating to a bladder volume from the outside; a calculation unit 132 configured to calculate the bladder volume from the configuration information, a passage time interval, and a speed of the ultrasonic wave 101; and a storage unit 133 configured to store information generated from the input unit 131 or the calculation unit 132.

The input unit 131 may be configured to receive control information and other input information from the outside.

The configuration information may include a bladder volume limit, a front wall distance limit, and a front wall to rear wall distance limit.

The configuration information may be information measured by a medical device, and the medical device may be configured to measure a bladder volume while an ultrasonic sensor is in contact with the skin. To this end, the medical device may be configured to measure a distance to a front wall of a bladder or a rear wall of the bladder through the ultrasonic sensor, and the medical device may be configured to measure a bladder volume limit, a front wall distance limit, and a front wall to rear wall distance limit. Furthermore, the configuration information measured by the medical device may include distance information relating to multiple particular points positioned on the front wall of the bladder. Therefore, the configuration information may include a percentage indicating the position of each of the particular points on the entire front wall of the bladder.

The bladder volume limit may indicate the volume of a user's bladder when a user is required to empty the bladder, and the bladder volume limit may indicate the volume of a bladder at a time point at which the bladder is filled with a designated volume of urine. The designated volume may cause the bladder monitoring device 100 to output a notification to alert a user to empty his/her bladder.

The front wall distance limit may indicate a distance from the ultrasonic sensor 121 to a front wall of a bladder, and may be measured by using the bladder volume limit. The front wall distance limit may be measured with respect to multiple particular points positioned on the front wall of the bladder.

The front wall to rear wall distance limit may indicate a distance from a front wall of a bladder to a rear wall of the bladder, and may be measured by using the bladder volume limit. The front wall to rear wall distance limit may be measured with respect to multiple particular points positioned on the front wall of the bladder.

The other input information may include an output type, a notification type, an operation configuration, etc. The output type may include a numerical type, a pictorial type, and a stepwise type, and the notification type may include a sound notification, a light notification, and a vibration notification. In addition, the operation configuration may include an ultrasonic wave transmission period, an initialization configuration, the number of stages, etc.

The ultrasonic wave transmission period may indicate a time interval according to which the ultrasonic sensor 121 transmits the ultrasonic wave 101.

The initialization configuration may be an input to remove all information stored in the bladder monitoring apparatus 100.

The number of stages may be used for the output module 140 to output a bladder volume and a bladder volume ratio in a stepwise type, and a minimum value of each of the stages may be determined according to the number of stages. For example, if the number of stages is four, a bladder volume and a bladder volume ratio may be output in four stages, and the output module 140 may output each of the stages when the bladder volume ratio is equal to or smaller than 25%, 50%, 75%, or 100%.

The input unit 131 may be configured to receive an input a screen brightness, contrast, color, etc. which are configurations related to the output type of the output module 140.

The input unit 131 may be configured to receive an input of a sound volume, a sound type, a light brightness, a light period, a lighting time, a vibration intensity, a vibration period, a vibration time, etc., which are configurations related to the notification type of the output module 140.

The calculation unit 132 may be configured to measure a passage time interval from a time point at which each of the ultrasonic sensors 121 transmits the ultrasonic wave 101 to a time point at which the same receives the reflected ultrasonic wave 101.

The calculation unit 132 may be configured to calculate distance information. The distance information may include distance ratio information, a front wall distance 103, a front wall to rear wall distance 104, a bladder volume ratio, a bladder volume, etc.

The distance ratio information may indicate a ratio between a front wall distance limit and a front wall to rear wall distance limit. The front wall distance limit may be in inverse proportion to the front wall to rear wall distance limit. The distance ratio information may be calculated with respect to each of particular points positioned on a front wall of a bladder.

The front wall distance 103 may be calculated from a passage time interval and the speed of the ultrasonic wave 101. Specifically, the front wall distance 103 may be calculated by multiplying the speed of the ultrasonic wave 101 to a value calculated by dividing the passage time interval by two. The front wall distance 103 may be calculated with respect to each of particular points positioned on a front wall of a bladder.

The front wall to rear wall distance 104 may indicate a distance from a front wall of a bladder to a rear wall of the bladder. The front wall to rear wall distance 104 may be calculated from the front wall distance 103 and distance ratio information. A ratio between a front wall distance limit and a front wall to rear wall distance limit may be the same as a ratio between the front wall distance 103 and the front wall to rear wall distance 104. Through this information, the front wall to rear wall distance 104 may be calculated from the front wall distance 103 and distance ratio information. The front wall distance 103 and the front wall to rear wall distance 104 may be in inverse proportion to each other. In addition, the front wall to rear wall distance 104 may be calculated with respect to each of particular points positioned on a front wall of a bladder.

The bladder volume may be calculated from multiple front wall to rear wall distances 104 calculated in the same ultrasonic wave transmission period. The multiple front wall to rear wall distances 104 may be calculated by using the multiple ultrasonic sensors 121.

The bladder volume ratio may indicate a ratio of a bladder volume to a bladder volume limit. Through this ratio, a user can identify a state of his/her bladder, and know when he/she is required to urinate.

The calculation unit 132 may be configured to calculate position information of multiple particular points on a front wall of a bladder. The position information may be a percentage related to a distance from one end of the front wall of the bladder to the other end.

The calculation unit 132 may be configured to calculate distance information with respect to each of particular points positioned on a front wall of a bladder. The distance information may include distance ratio information, the front wall distance 103, the front wall to rear wall distance 104, etc.

The storage unit 133 may be configured to store configuration information and other inputs. In addition, the storage unit 133 may be configured to store distance ratio information, the front wall distance 103, the front wall to rear wall distance 104, a bladder volume ratio, a bladder volume, etc.

The storage unit 133 may be configured to, when the output module 140 outputs a bladder volume or a bladder volume ratio, remove the front wall distance 103 and the front wall to rear wall distance 104 which are stored in the storage unit 133.

Furthermore, the storage unit 133 may be configured to overwrite the front wall distance 103, the front wall to rear wall distance 104, a bladder volume, and a bladder volume ratio which are newly calculated, on the front wall distance 103, the front wall to rear wall distance 104, a bladder volume, and a bladder volume ratio which are previously calculated, in a process where the output module 140 outputs a bladder volume or a bladder volume ratio, and a new bladder volume or a new bladder volume ratio is calculated according to an ultrasonic wave transmission period.

The storage unit 133 may be configured to, when an initialization input is received by the input unit 131, remove all information stored in the storage unit 133. Accordingly, the input unit 131 may receive an input of configuration information again to reuse the bladder monitoring apparatus 100.

In order to simply and easily measure a bladder volume, the bladder monitoring apparatus 100 may calculate a bladder volume from the number of ultrasonic sensors 121 measuring a front wall of a bladder, and a passage time interval from a time point at which the ultrasonic sensors 121 transmit the ultrasonic waves 101 toward a front wall of a bladder to a time point at which the same receive the reflected ultrasonic waves 101.

The bladder monitoring apparatus 100 can simply and easily measure a bladder volume by calculating, in various methods, the number of ultrasonic sensors 121 measuring a front wall of a bladder, and a passage time interval from transmission of the ultrasonic wave 101 to reception of the reflected ultrasonic wave 101. However, in the following description, a specific embodiment for simply and easily measuring a bladder volume will be described.

The calculation unit 132 may generate a passage time interval from a time point at which each of the ultrasonic sensors 121 transmits the ultrasonic wave 101 toward a front wall of a bladder to a time point at which the same receives the ultrasonic wave 101 returning after being reflected by the front wall of the bladder.

The calculation unit 132 may generate the number of reception sensors, which indicates the number of ultrasonic sensors each of which has measured a passage time interval falling within a range allowing the determination of reception of the ultrasonic wave 101 returning after being reflected by the front wall of the bladder.

The calculation unit 132 may calculate a front wall distance indicating a distance from the ultrasonic sensor to the front wall of the bladder, from the passage time interval and the speed of the ultrasonic wave 101.

The input unit 131 may receive a bladder limit measurement command from the outside.

The ultrasonic sensor module 120 may transmit, when the input unit 131 receives an input of a bladder limit measurement command, the ultrasonic wave 101 toward the front wall of the bladder and receive the reflected ultrasonic wave 101. Accordingly, the calculation unit 132 may generate the passage time interval and the number of reception sensors.

The calculation unit 132 may calculate a front wall distance limit indicating a distance from the ultrasonic sensor to the front wall of the bladder from the speed of the ultrasonic wave 101 and the passage time interval generated by the bladder limit measurement command received by the input unit 131.

The calculation unit 132 may designate, as a limit number of reception sensors, the number of reception sensors generated by the bladder limit measurement command received by the input unit 131.

The storage unit 133 may store the front wall distance limit and the limit number of reception sensors which are generated by the calculation unit 132.

The calculation unit 132 may generate a unit bladder volume by dividing, by the limit number of reception sensors, a bladder capacity causing an output of a notification to alert a user to urinate. Generally, the bladder capacity causing an output of a notification may be 400 millimeters.

The calculation unit 132 may multiply the number of reception sensors to the unit bladder volume to simply and easily calculate the bladder volume.

The output module 140 may output a notification when the simply and easily calculated bladder volume is equal to or larger than the bladder capacity causing an output of a notification.

Figure 4:
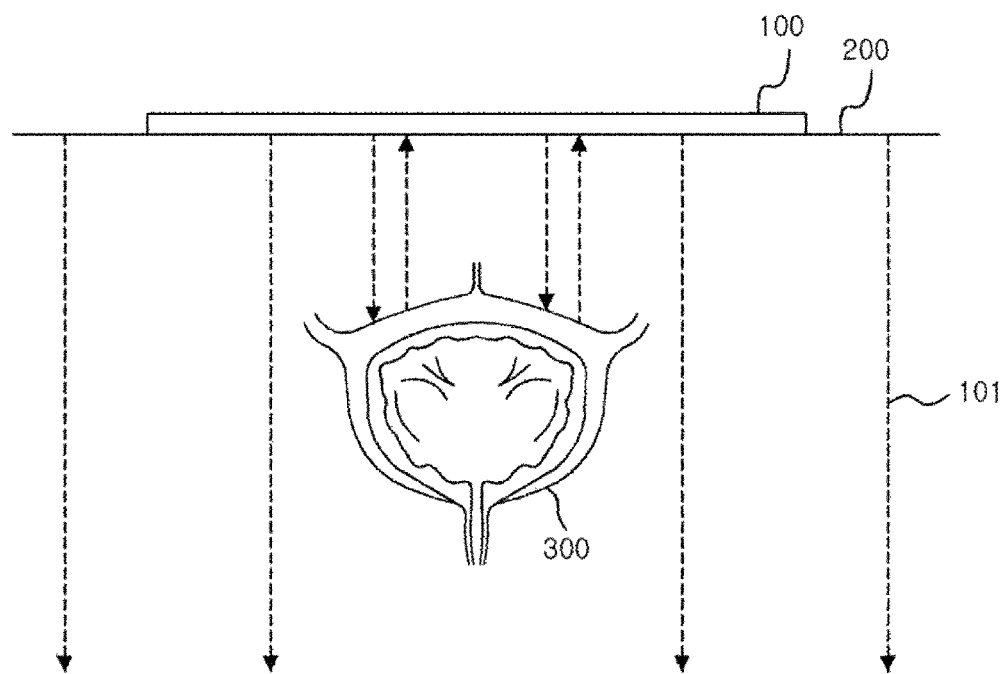
FIG. 4 is a schematic diagram of a method of transmitting an ultrasonic wave to a bladder and receiving the reflected ultrasonic wave in a bladder monitoring method according to an embodiment of the present disclosure.

FIG. 4 is a schematic diagram of a method of transmitting an ultrasonic wave to a bladder and receiving the reflected ultrasonic wave according to an embodiment of the present disclosure.

The bladder monitoring apparatus 100 may be implemented to be detachably attached to a user's skin 200. Accordingly, the user may attach the bladder monitoring apparatus 100 to the user's skin 200 adjacent to a bladder 300, and start a bladder volume measurement.

The bladder monitoring apparatus 100 may transmit the ultrasonic wave 101 toward the bladder 300. The bladder monitoring apparatus 100 may transmit the ultrasonic wave 101 toward a front wall of the bladder, and receive the ultrasonic wave 101 returning after being reflected by the front wall of the bladder. Through this process, the bladder monitoring apparatus may measure a passage time interval from a time point of transmission of the ultrasonic wave 101 to a time point of reception of the ultrasonic wave 101 returning after being reflected by the front wall of the bladder.

The bladder monitoring apparatus 100 may generate a non-reception signal if reception of the ultrasonic wave 101 returning after being reflected by the front wall of the bladder fails. Accordingly, the bladder monitoring apparatus 100 may measure a range of the front wall of the bladder.

The bladder monitoring apparatus 100 may transmit the ultrasonic wave 101 according to an ultrasonic wave transmission period, and the bladder monitoring apparatus 100 may re-measure a bladder volume according to the ultrasonic wave transmission period.

Figure 5:
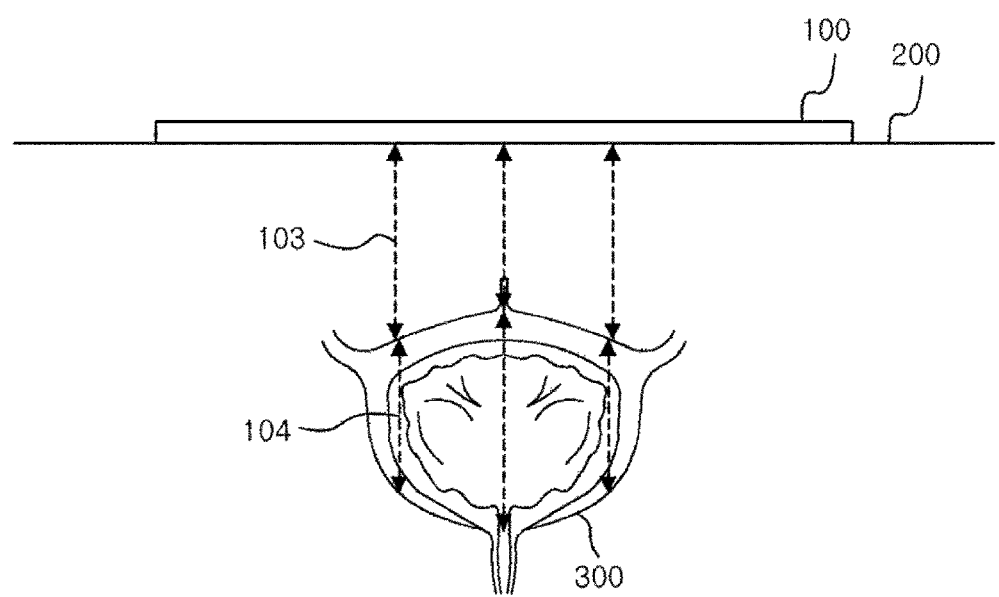
FIG. 5 is a schematic diagram of a method of measuring distance information in a bladder monitoring method according to an embodiment of the present disclosure.

FIG. 5 is a schematic diagram of a method of measuring distance information in a bladder monitoring method according to an embodiment of the present disclosure.

In a bladder monitoring method using the bladder monitoring apparatus 100 according to an embodiment of the present disclosure, a bladder volume may be calculated by detecting only a distance to a front wall of a bladder. Specifically, distance ratio information may be calculated from a front wall distance limit and a front wall to rear wall distance limit which are previously input, and the front wall to rear wall distance 104 may be calculated from the distance ratio information and a front wall distance 103, based on that the distance ratio information can be the same as a ratio between the front wall distance 103 and the front wall to rear wall distance 104. Accordingly, the bladder volume may be calculated from multiple front wall to rear wall distances 104 calculated in the same ultrasonic wave transmission period. A bladder volume ratio may be calculated by calculating a ratio of the bladder volume to a bladder volume limit.

Figure 6:
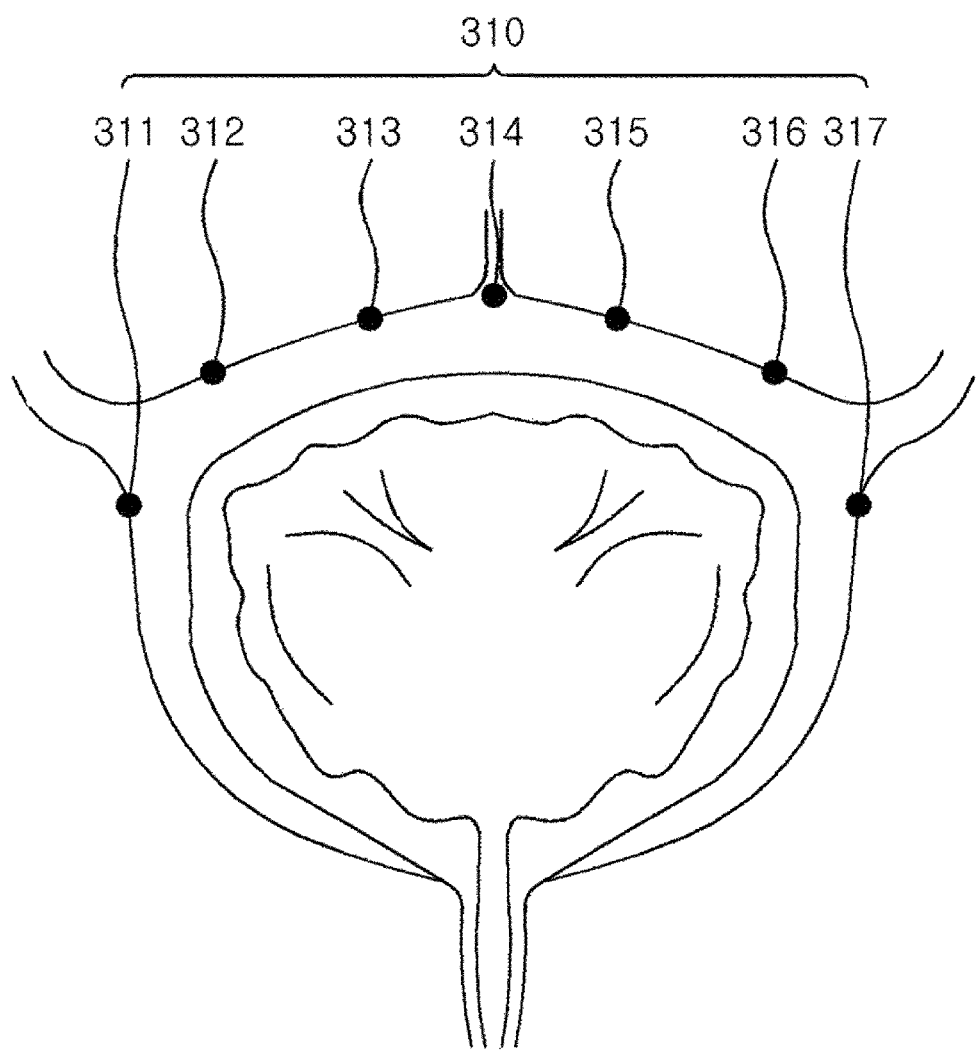
FIG. 6 is a schematic diagram illustrating a particular point on a front wall of a bladder according to an embodiment of the present disclosure.

FIG. 6 is a schematic diagram illustrating a particular point on a front wall of a bladder according to an embodiment of the present disclosure.

An embodiment according to FIG. 6 is provided to help understanding of particular points 310, and the present disclosure is not limited by the embodiment according to FIG. 6.

The positions of the particular points 310 may be determined by a percentage related to a range of a bladder front wall, which is measured by the ultrasonic sensors 121.

A first particular point 311 may be determined to be a position represented by 0% calculated through calculation of the range of the bladder front wall in percentages.

A second particular point 312 may be determined to be a position represented by 16.67% calculated through calculation of the range of the bladder front wall in percentages.

A third particular point 313 may be determined to be a position represented by 33.34% calculated through calculation of the range of the bladder front wall in percentages.

A fourth particular point 314 may be determined to be a position represented by 50% calculated through calculation of the range of the bladder front wall in percentages.

A fifth particular point 311 may be determined to be a position represented by 66.67% calculated through calculation of the range of the bladder front wall in percentages.

A sixth particular point 316 may be determined to be a position represented by 83.34% calculated through calculation of the range of the bladder front wall in percentages.

A seventh particular point 317 may be determined to be a position represented by 100% calculated through calculation of the range of the bladder front wall in percentages.

A front wall distance limit may be a distance from the ultrasonic sensor 121 to each of the particular points 310 positioned on the bladder front wall.

A front wall to rear wall distance limit may be a distance to a bladder rear wall from each of the particular points 310 positioned on the bladder front wall. The bladder rear wall may include a point at which the bladder rear wall meets a linear line including a particular point 310 and further including a front wall distance limit 103 measured with respect to the corresponding particular point 310.

A front wall distance 103 may be a distance from the ultrasonic sensor 121 to each of the particular points 310 positioned on the bladder front wall.

A front wall to rear wall distance 104 may be a distance to the bladder rear wall from each of the particular points 310 positioned on the bladder front wall. The bladder rear wall may include a point at which the bladder rear wall meets a linear line including a particular point 310 and further including a front wall distance 103 measured with respect to the corresponding particular point 310.

Figure 7:
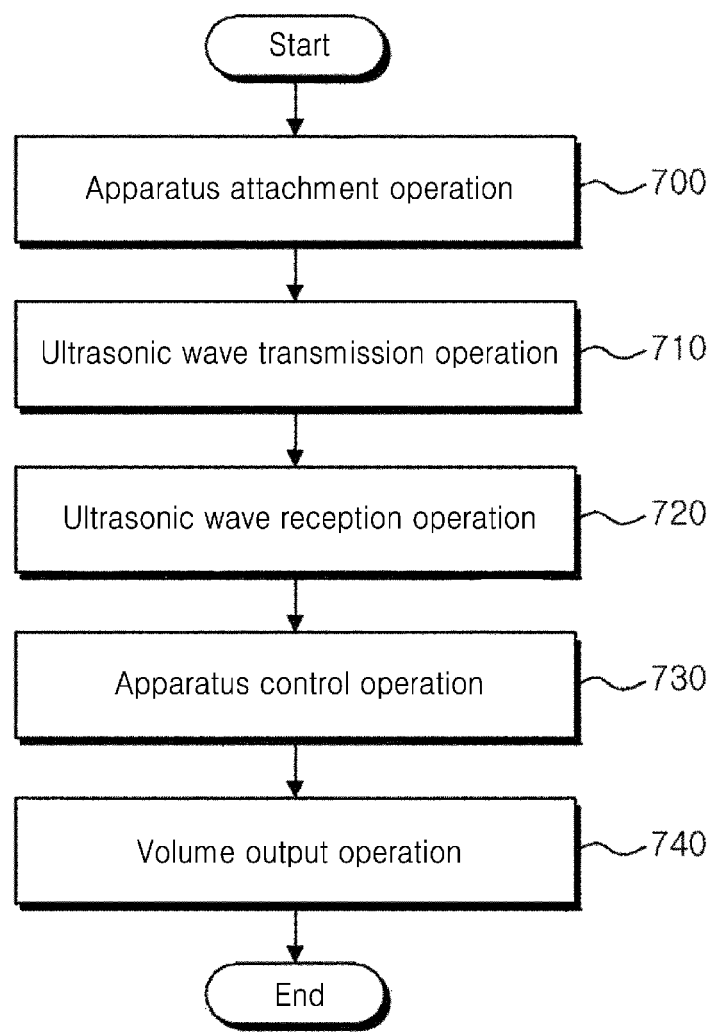
FIG. 7 is a flowchart of a bladder monitoring method according to an embodiment of the present disclosure.

FIG. 7 is a flowchart of a bladder monitoring method according to an embodiment of the present disclosure.

A bladder monitoring method according to an embodiment of the present disclosure may include: an ultrasonic wave transmission operation 710 of transmitting, by the ultrasonic sensor 121, the ultrasonic wave 101 toward a front wall of a bladder; an ultrasonic wave reception operation 720 of receiving the ultrasonic wave 101 returning after reflection, by the front wall of the bladder, of the ultrasonic wave 101 transmitted toward the front wall of the bladder in the ultrasonic wave transmission operation 710, and generating a passage time interval relating to the ultrasonic wave 101; an apparatus control operation 730 of calculating a volume of the bladder from the passage time interval and a speed of the ultrasonic wave 101; and a volume output operation 740 of outputting the bladder volume calculated in the apparatus control operation 730.

An apparatus attachment operation 700 may be an operation of attaching the bladder monitoring apparatus 100 on a portion at which the ultrasonic wave 101 reaches the bladder 300 when the ultrasonic sensor 121 transmits the ultrasonic wave 101.

The ultrasonic wave transmission operation 710 may be an operation of transmitting, by the ultrasonic sensor 121, the ultrasonic wave 101 toward a front wall of a bladder.

In the ultrasonic wave transmission operation 710, the ultrasonic wave 101 may be transmitted according to an ultrasonic wave transmission period input by a user. Accordingly, the ultrasonic wave transmission operation 710, the ultrasonic wave reception operation 720, the apparatus control operation 730, and the volume output operation 740 may be repeated according to the ultrasonic wave transmission period.

In the ultrasonic wave transmission operation 710, when the ultrasonic wave 101 is transmitted, a measurement of a passage time interval may be started. The passage time interval may indicate a time interval from transmission of the ultrasonic wave 101 to reception of the reflected ultrasonic wave 101.

The ultrasonic wave reception operation 720 may be an operation of receiving the ultrasonic wave 101 which returns after reflection of the ultrasonic wave 101 colliding with the bladder 300.

In the ultrasonic wave reception operation 720, when the reflected ultrasonic wave 101 is received, the measurement of the passage time interval which has started in the ultrasonic wave transmission operation 710 may be terminated.

In the apparatus control operation 730, a front wall distance 103 may be calculated from the passage time interval. In addition, a bladder volume ratio and a bladder volume may be calculated from configuration information input from the outside and the front wall distance 103. The apparatus control operation 730 will be described in detail with reference to FIG. 7.

In the volume output operation 740, the bladder volume and the bladder volume ratio may be output. The bladder volume may be calculated in the apparatus control operation 730, and the bladder volume ratio may represent a ratio of the bladder volume to a bladder volume limit.

In the volume output operation 740, when the bladder volume ratio is higher than a pre-configured notification output ratio, a notification may be output. To this end, in the apparatus control operation 730, an input of a notification output ratio may be received. The notification such as a sound notification, a light notification, and a vibration notification may be output.

In the volume output operation 740, the bladder volume and the bladder volume ratio may be output in a numerical type. The numerical type may express the bladder volume ratio as a percentage related to the bladder volume limit and may express a value of a bladder volume calculated from the bladder volume limit and the bladder volume ratio.

In the volume output operation 740, the bladder volume and the bladder volume ratio may be output in a pictorial type. The pictorial type may indicate coloring a picture showing the empty bladder 300 according to the bladder volume ratio. In addition, the pictorial type may show a pictorial shape of the bladder 300 expanding according to the bladder volume ratio.

In the volume output operation 740, the bladder volume and the bladder volume ratio may be output in a stepwise type. Stages may be configured according to a predetermined ratio interval in relation to a bladder volume limit, and in the volume output operation 740, when the bladder volume ratio is equal to or smaller than a minimum value of a particular stage, the corresponding stage may be output.

Figure 8:
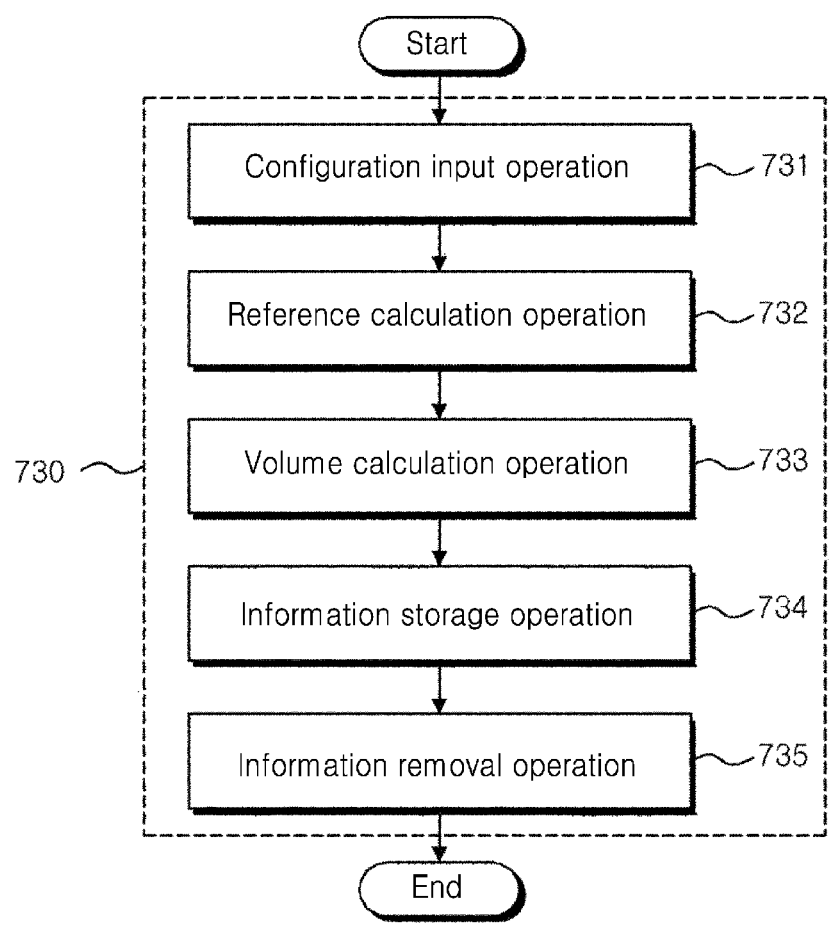
FIG. 8 is a flowchart of an apparatus control operation in a bladder monitoring method according to an embodiment of the present disclosure.

FIG. 8 is a flowchart of an apparatus control operation in a bladder monitoring method according to an embodiment of the present disclosure.

The apparatus control operation 730 may include: a configuration input operation 731 of receiving configuration information from the outside; a reference calculation operation 732 of calculating distance ratio information from the configuration information; a volume calculation operation 733 of calculating the bladder volume from the configuration information, the distance ratio information, and the passage time interval; and an information storage operation 734 of storing the pieces of information which are generated in the configuration input operation 731, the reference calculation operation 732, and the volume calculation operation 733; and an information removal operation 735 of removing information stored in the information storage operation 734.

In the configuration input operation 731, configuration information and other input information may be received from the outside. The configuration input operation 731 may be started before the apparatus attachment operation 700. In this case, a passage time interval for calculating a bladder volume has not been measured yet, and thus the procedure may be performed up to the reference calculation operation 732.

The configuration information may include a bladder volume limit, a front wall distance limit, and a front wall to rear wall distance limit, and the other input information may include an output type, a notification type, an operation configuration, etc.

The configuration information may be information measured by a medical device, and the medical device may be configured to measure a bladder volume while an ultrasonic sensor is in contact with the skin 200. To this end, the medical device may be configured to measure a distance to a front wall of a bladder or a rear wall of the bladder through the ultrasonic sensor, and the medical device may be configured to measure a bladder volume limit, a front wall distance limit, and a front wall to rear wall distance limit. Furthermore, the configuration information measured by the medical device may include distance information relating to the multiple particular points 310 positioned on the front wall of the bladder. Therefore, the configuration information may include a percentage indicating the position of each of the particular points 310 with respect to a range of the front wall of the bladder.

The bladder volume limit may indicate the volume of a user's bladder when a user is required to empty the bladder, and the bladder volume limit may indicate the volume of the bladder 300 at a time point at which the bladder 300 is filled with a designated volume of urine. The designated volume may cause the bladder monitoring device 100 to output a notification to alert the user to empty the bladder 300.

The front wall distance limit may indicate a distance from the ultrasonic sensor 121 to a front wall of a bladder, and may be measured by using the bladder volume limit. The front wall distance limit may be measured with respect to the multiple particular points 310 positioned on the front wall of the bladder.

The front wall to rear wall distance limit may indicate a distance from a front wall of a bladder to a rear wall of the bladder, and may be measured by using the bladder volume limit. The front wall to rear wall distance limit may be measured with respect to the multiple particular points 310 positioned on the front wall of the bladder.

The other input information may include an output type, a notification type, an operation configuration, etc. The output type may include a numerical type, a pictorial type, and a stepwise type, and the notification type may include a sound notification, a light notification, and a vibration notification. In addition, the operation configuration may include an ultrasonic wave transmission period, an initialization configuration, the number of stages, etc.

The ultrasonic wave transmission period may indicate a time interval according to which the ultrasonic sensor 121 transmits the ultrasonic wave 101.

The initialization configuration may be an input to remove all information stored in the information storage operation 734.

The number of stages may be used when a bladder volume and a bladder volume ratio are output in a stepwise type in the volume output operation 740, and a minimum value of each of the stages may be determined according to the number of stages. For example, if the number of stages is four, a bladder volume and a bladder volume ratio may be output in four stages, and in the volume output operation 740, when the bladder volume ratio is equal to or smaller than 25%, 50%, 75%, or 100%, each of the stages may be output.

In the reference calculation operation 732, distance ratio information may be calculated. The distance ratio information may indicate that the front wall distance limit and the front wall to rear wall distance limit are be in inverse proportion to each other.

In the volume calculation operation 733, the front wall distance 103 may be calculated from the passage time interval and the speed of the ultrasonic wave 101.

In the volume calculation operation 733, the front wall to rear wall distance 104 may be calculated from the front wall distance 103 and the distance ratio information. Specifically, a ratio between the front wall distance limit and the front wall to rear wall distance limit may be the same as a ratio between the front wall distance 103 and the front wall to rear wall distance 104. Through this information, the front wall to rear wall distance 104 may be calculated from the front wall distance 103 and the distance ratio information.

In the volume calculation operation 733, a bladder volume and a bladder volume ratio may be calculated. The bladder volume may be calculated from multiple front wall to rear wall distances 104 calculated in the same ultrasonic wave transmission period. The multiple front wall to rear wall distances 104 may be calculated by using multiple ultrasonic sensors 121.

The volume calculation operation 733 may be started without the configuration input operation 731 and the reference calculation operation 732 when the ultrasonic wave transmission operation 710 is repeated according to an ultrasonic wave transmission period. Accordingly, the volume calculation operation 733, the information storage operation 734, and the information removal operation 735 may be repeated in order to calculate a new bladder volume ratio and a new bladder volume according to the ultrasonic wave transmission period.

In the information storage operation 734, information generated in the configuration input operation 731, the reference calculation operation 732, and the volume calculation operation 733 may be stored. The generated information may include configuration information, other inputs, distance ratio information, a front wall distance 103, a front wall to rear wall distance 104, a bladder volume ratio, a bladder volume, etc.

In the information removal operation 735, when a bladder volume or a bladder volume ratio is output in the volume output operation 740, the front wall distance 103 and the front wall to rear wall distance 104 may be removed.

Furthermore, in the information removal operation 735, the front wall distance 103, the front wall to rear wall distance 104, a bladder volume ratio, and a bladder volume may be overwritten on the front wall distance 103, the front wall to rear wall distance 104, a bladder volume ratio, and a bladder volume which are previously calculated, in a process where a new bladder volume ratio or a new bladder volume is calculated through the repetition of the ultrasonic wave transmission operation 710 according to an ultrasonic wave transmission period.

In the information removal operation 735, when an input of an initialization configuration is received in the configuration input operation 731, all information stored in the information storage operation 734 may be removed.

In the bladder monitoring method, in order to simply and easily measure a bladder volume, the bladder volume may be calculated from the number of ultrasonic sensors 121 measuring a front wall of a bladder, and a passage time interval from a time point at which the ultrasonic sensors 121 transmit the ultrasonic waves 101 toward a front wall of a bladder to a time point at which the sensors receive the reflected ultrasonic waves 101.

The bladder monitoring apparatus 100 can simply and easily measure a bladder volume by calculating, in various methods, the number of ultrasonic sensors 121 measuring a front wall of a bladder, and a passage time interval from transmission of the ultrasonic wave 101 to reception of the reflected ultrasonic wave 101. However, in the following description, a specific embodiment for simply and easily measuring a bladder volume will be described.

In the ultrasonic wave transmission operation 710, when the ultrasonic wave 101 is transmitted, a measurement of a passage time interval may be started. The passage time interval may indicate a time interval from transmission of the ultrasonic wave 101 to reception of the reflected ultrasonic wave 101.

In the ultrasonic wave reception operation 720, when the reflected ultrasonic wave 101 is received, the measurement of the passage time interval may be terminated to generate a passage time interval from a time point at which each of the ultrasonic sensors 121 transmits the ultrasonic wave 101 toward a front wall of a bladder to a time point at which the same receives the ultrasonic wave 101 returning after being reflected by the front wall of the bladder.

In the ultrasonic wave reception operation 720, the number of reception sensors, which indicates the number of ultrasonic sensors each of which has measured a passage time interval falling within a range allowing the determination of reception of the ultrasonic wave 101 returning after being reflected by the front wall of the bladder, may be generated.

In the apparatus control operation 730, a front wall distance indicating a distance from the ultrasonic sensor to the front wall of the bladder may be calculated from the passage time interval and the speed of the ultrasonic wave 101.

In the configuration input operation 731, a bladder limit measurement command may be received from the outside.

The ultrasonic sensor module 120 may transmit, when an input of a bladder limit measurement command is received in the configuration input operation 731, the ultrasonic wave 101 toward the front wall of the bladder and receive the reflected ultrasonic wave 101. Accordingly, in the ultrasonic wave reception operation 720, the passage time interval and the number of reception sensors may be generated.

In the apparatus control operation 730, a front wall distance limit indicating a distance from the ultrasonic sensor to the front wall of the bladder may be calculated from the speed of the ultrasonic wave 101 and the passage time interval generated by the bladder limit measurement command received in the configuration input operation 731.

In the apparatus control operation 730, the number of reception sensors generated by the bladder limit measurement command received in the configuration input operation 731 may be designated as a limit number of reception sensors.

In the information storage operation 734, the front wall distance limit and the limit number of reception sensors which are generated in the apparatus control operation 730 may be stored.

In the volume calculation operation 733, a unit bladder volume may be generated by dividing, by the limit number of reception sensors, a bladder capacity causing an output of a notification to alert a user to urinate. Generally, the bladder capacity causing an output of a notification may be 400 millimeters.

In the volume calculation operation 733, the bladder volume may be simply and easily calculated by multiplying the number of reception sensors to the unit bladder volume.

In the volume output operation 740, a notification may be output when the simply and easily calculated bladder volume is equal to or larger than the bladder capacity causing an output of a notification.

DESCRIPTION OF REFERENCE NUMERALS

100: Bladder monitoring apparatus
101: Ultrasonic wave
120: Ultrasonic sensor module
121: Ultrasonic sensor
130: Control module
140: Output module
200: Skin
300: Bladder
310: Particular points
311: First particular point
312: Second particular point
313: Third particular point
314: Fourth particular point
315: Fifth particular point
316: Sixth particular point
317: Seventh particular point

The invention claimed is:

1. A bladder monitoring method by a bladder monitoring apparatus configured to be detachably attached to a user's skin adjacent to a user's bladder and including an ultrasonic sensor, the method comprising:
   an ultrasonic wave transmission operation of transmitting, by the ultrasonic sensor, an ultrasonic wave toward a front wall of the bladder;
   an ultrasonic wave reception operation of receiving the ultrasonic wave returning after reflection, by the front wall of the bladder, of the ultrasonic wave transmitted toward the front wall of the bladder in the ultrasonic wave transmission operation, and generating a passage time interval relating to the ultrasonic wave;
   an apparatus control operation of calculating only a front wall distance from the passage time interval and a speed of the ultrasonic wave, the front wall distance being a distance from the ultrasonic sensor to the front wall of the bladder wall distance and configuration information input from an outside of the bladder monitoring apparatus; and
   wherein the apparatus control operation further comprises:
   a configuration information input operation of receiving the configuration information,
      the configuration information comprising:
         a bladder volume limit indicating the bladder volume of a time point at which the bladder is filled with a designated volume of urine;
         a front wall distance limit indicating a distance from the ultrasonic sensor to the front wall of the bladder in a state of the bladder volume limit; and
         a front wall to rear wall distance limit indicating a distance from the front wall of the bladder to a rear wall of the bladder in a state of the bladder volume limit;
   a reference calculation operation of calculating a distance ratio information indicating a ratio between the front wall distance limit and the front wall to rear wall distance limit, from the configuration information;
   a volume calculation operation of calculating a front wall to rear wall distance by multiplying the front wall distance by the distance ratio information, the front wall to rear wall distance being a distance from the front wall of the bladder to the rear wall of the bladder, calculating the bladder volume based on the front wall to rear wall distance; and
   a volume output operation of outputting the bladder volume calculated in the apparatus control operation.

2. The method of claim 1, wherein the apparatus control operation further comprises:
   an information storage operation of storing at least one of pieces of information which are generated in the configuration input operation, the reference calculation operation, and the volume calculation operation; and
   an information removal operation of removing the at least one piece of information stored in the information storage operation.

3. The method of claim 1,
wherein the volume calculation operation comprises:
calculating the front wall distance from the passage time interval and the speed of the ultrasonic wave; and
calculating a bladder volume ratio from the bladder volume limit and the bladder volume,
wherein the front wall to rear wall distance includes multiple front wall to rear wall distances calculated in a process of a bladder volume measurement which is started according to transmission of an ultrasonic wave by each of multiple ultrasonic sensors.

4. The method of claim 3, wherein the information storage operation comprises storing at least one of the configuration information, the distance ratio, the front wall distance, the front wall to rear wall distance, the bladder volume ratio, and the bladder volume.

5. The method of claim 4, wherein the volume output operation comprises:
outputting at least one of the bladder volume or the bladder volume ratio which is stored in the information storage operation; and
outputting a notification when the bladder volume ratio is larger than a pre-configured notification output ratio.

6. The method of claim 5, wherein the information removal operation comprises, when at least one of the bladder volume or the bladder volume ratio is output in the volume output operation, removing the front wall distance and the front wall to rear wall distance which are stored in the information storage operation.

7. The method of claim 1, wherein the ultrasonic sensor includes multiple ultrasonic sensors arranged according to a two-dimensional arrangement, and
wherein the volume calculation operation comprises calculating the bladder volume from multiple front wall to rear wall distances calculated in a process of a bladder volume measurement which is started according to transmission of an ultrasonic wave by each of the multiple ultrasonic sensors.

\* \* \* \* \*